United States Patent
Momcilovic et al.

(10) Patent No.: US 11,176,716 B2
(45) Date of Patent: Nov. 16, 2021

(54) MULTI-SOURCE IMAGE DATA SYNCHRONIZATION

(71) Applicant: Weta Digital Limited, Wllington (NZ)

(72) Inventors: Dejan Momcilovic, Wellington (NZ); Erik B. Edlund, Wellington (NZ); Tobias B. Schmidt, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

(21) Appl. No.: 17/178,149

(22) Filed: Feb. 17, 2021

(65) Prior Publication Data
US 2021/0272334 A1    Sep. 2, 2021

Related U.S. Application Data

(60) Provisional application No. 62/983,521, filed on Feb. 28, 2020.

(51) Int. Cl.
*G06T 11/00* (2006.01)
*G06T 7/50* (2017.01)

(52) U.S. Cl.
CPC .............. *G06T 11/006* (2013.01); *G06T 7/50* (2017.01); *G06T 11/005* (2013.01); *G06T 2207/10016* (2013.01); *G06T 2211/424* (2013.01); *G06T 2211/428* (2013.01)

(58) Field of Classification Search
CPC .. G06K 9/00664; G06K 9/00671; G06T 7/50; G06T 7/70; G06T 7/73; G06T 7/74; G06T 7/97; G06T 11/00; G06T 13/00; G06T 13/20; G06T 15/00; G06T 17/00; G06T 19/00; G06T 19/006; G06T 2207/30204; G06T 2215/16
See application file for complete search history.

(56) References Cited

U.S. PATENT DOCUMENTS

| | | | |
|---|---|---|---|
| 2004/0041822 A1* | 3/2004 | Iizuka et al. | G06T 15/10 345/634 |
| 2011/0249095 A1* | 10/2011 | Kim et al. | G06T 7/80 348/46 |
| 2013/0215229 A1* | 8/2013 | Yerli | G06T 13/20 348/46 |
| 2015/0022552 A1* | 1/2015 | Ito | G06T 11/00 345/633 |

(Continued)

OTHER PUBLICATIONS

Georg Klein: "Visual tracking for augmented reality", Jan. 1, 2006 (Jan. 1, 2006), XP055719302, Retrieved from the Internet: URL:http://www.robots.ox.ac.uk/-gk/publications/Klein2006Thesis.pdf the whole document.

*Primary Examiner* — Andrew W Johns
(74) *Attorney, Agent, or Firm* — Trellis IP Law Group, PC; Lisa Benado

(57) ABSTRACT

Compositing is provided in which visual elements from different sources, including live action objects and computer graphic (CG) merged in a constant feed. Representative output images are produced during a live action shoot. The compositing system uses supplementary data, such as depth data of the live action objects for integration with CG items and light marker detection data for device calibration and performance capture. Varying capture times (e.g., exposure times) and processing times are tracked to align with corresponding incoming images and data.

20 Claims, 5 Drawing Sheets

(56) References Cited

U.S. PATENT DOCUMENTS

| | | |
|---|---|---|
| 2015/0248785 A1 | 9/2015 | Holmquist |
| 2017/0193666 A1 | 7/2017 | Weiss et al. |
| 2018/0046874 A1* | 2/2018 | Guo et al. ............ G06K 9/3208 |
| 2018/0053308 A1 | 2/2018 | Maani et al. |
| 2018/0182173 A1* | 6/2018 | Robaina et al. ...... G02B 6/0008 |
| 2018/0189974 A1 | 7/2018 | Clark et al. |

* cited by examiner

MULTI-SOURCE IMAGE DATA SYNCHRONIZATION

CLAIM OF PRIORITY AND RELATED APPLICATIONS

This application claims the benefit of U.S. Provisional Patent Application Serial No. U.S. Provisional patent application Ser. No. 62/983,521, entitled SIMULCAM CALIBRATION filed Feb. 28, 2020 which is hereby incorporated by reference as if set forth in full in this application for all purposes.

This application is related to the following application, U.S. patent application Ser. No. 17/081,843, entitled SYSTEM FOR IMAGE COMPOSITING INCLUDING TRAINING WITH SYNTHETIC DATA, filed on Oct. 27, 2020, which is hereby incorporated by reference as if set forth in full in this application for all purposes.

BACKGROUND

In many visual productions (e.g., movies, videos, clips, and recorded visual media) real and digital images are combined to create animation and special effects that form an illusion of being integrated with live action. For example, a visual production may include a live actor in a location shoot appearing in a scene with a computer-generated ("CG," "virtual," or "digital") character. It is desirable to produce seemingly realistic visual productions by compositing CG items with the live action items.

Recording live action occurs in real time and often requires many "takes" if the shot is not right. It is beneficial to be able to generate a composited imagery in real time, or near real-time, so that on-set assessments of the recorded takes can be made. Creators (e.g., directors, actors, etc.) of live action shots or recordings, may be able to better interact with and utilize the digital models if, at the time of recording, or "shooting," the live action scenes, the live action creators have access to a close approximation of the final composited imagery.

Often several types of cameras are used on a set, each providing different data, such as images of the live action scene, depth information, tracking of markers in a live action scene, etc. It is necessary to sync data and images from the various camera data in real-time to accurately composite the live action elements with CG images and produce a realistic looking visual production.

SUMMARY

A compositing system of a visual content generation system is provided for generating in real time, composited images of shots of live action scenes and virtual elements in the making of a visual production. The compositing system uses supplementary data, such as depth data for live action objects and light marker detection data for performance capture. During the shooting of the live action scene, virtual elements may be constructed to be consistent with the live action shot. The composited image may be providing to creators of the visual production so that adjustments may be made on the fly. Varying capture and processing times from sources are tracked to align data with corresponding incoming images.

In some implementations, a computer-implemented method may be performed in real time for correlating data and images from a live action scene, under control of one or more computer systems configured with executable instructions. The method may include receiving auxiliary images with depth including depth data of target objects in corresponding live action images of the live action scene. Further, the method may include receiving marker images generated from a performance capture system. Determination may be made that at least one of the marker images corresponds with at least one of the images with depth. The marker data and the corresponding at least one auxiliary image with depth may be received at different times associated with particular time blocks. The marker data and the corresponding at least one auxiliary image with depth may be provided to a computer graphic (CG) rendering system to generate a CG image having one or more CG elements based, at least in part, on the depth data of the corresponding auxiliary image with depth. According to the method, the CG elements may be composited with the corresponding at least one auxiliary image with depth to generate at least one representative output image. The at least one representative output image may be provided to an output display device for creators of the visual production to view during shooting of the live action scene.

In some implementation determination of the marker data and the corresponding at least one auxiliary image with depth, is based, at least in part, on an exposure time of a camera capturing the corresponding images of the live action scene and/or an exposure time of the performance capture system. Also, determination of the marker data and the corresponding at least one auxiliary image with depth may be further based, at least in part, on an exposure time of at least one depth camera capturing at least one depth image to provide the depth data. At times, the live action images and the marker images may include time stamps. The determination of the marker data and the corresponding at least one auxiliary image with depth may be based on the time stamps. The method may be performed during capturing of images of the live action scene.

In some implementations, marker data and at least one auxiliary image with depth are determined to correspond based, at least in part, on an exposure time of at least one depth camera capturing at least one depth image to provide the depth data. A unique identifier may be generated for the marker data and the corresponding at least one auxiliary image with depth. The method may further be iteratively repeated to produce additional representative output images as additional live action images are captured of the live action scene.

In some implementations, a visual content composition system may be provided for correlating images from a live action scene in real time. The system comprises one or more processors and logic encoded in one or more tangible media for execution by the one or more processors and when executed is operable to perform operations. The operation may include receiving auxiliary images with depth including depth data of target objects in corresponding live action images of the live action scene. The operations may further include receiving marker images generated from a performance capture system. According to the operations, it may be determined that at least one of the marker images corresponds with at least one of the images with depth. The marker data and the corresponding at least one auxiliary image with depth may be received at different times associated with particular time blocks. The marker data and the corresponding at least one auxiliary image with depth may be provided to a computer graphic (CG) rendering system to generate a CG image having one or more CG elements. The one or more CG elements may be based, at least in part, on the depth data of the corresponding auxiliary image with depth. The operations further may include compositing the CG elements with the corresponding at least one auxiliary image with depth to generate at least one representative output image.

In some implementations, the operations include determining the marker data and the corresponding at least one auxiliary image with depth, based, at least in part, on an exposure time of a camera capturing the corresponding images of the live action scene and an exposure time of the performance capture system. The determination may also be based, at least in part, on an exposure time of at least one depth camera capturing at least one depth image to provide the depth data. In some systems, live action images and the marker images may include time stamps and determining of the marker data and the corresponding at least one auxiliary image with depth may be based on the time stamps.

In some implementations, the operations may include generating a unique identifier for the marker data and the corresponding at least one auxiliary image with depth. The operations of the system may be iteratively repeated to produce additional representative output images as additional live action images are captured of the live action scene. The operations are typically performed during a capturing of images of the live action scene.

In still some implementations, a non-transitory computer-readable storage medium may be provided that carries program instructions thereon to correlate data and images from a live action scene in real time, the instructions when executed by one or more processors cause the one or more processors to perform operations. The operations may include receiving auxiliary images with depth including depth data of target objects in corresponding live action images of the live action scene. The operations may further include receiving marker images generated from a performance capture system. According to the operations, it may be determined that at least one of the marker images corresponds with at least one of the images with depth. The marker data and the corresponding at least one auxiliary image with depth may be received at different times associated with particular time blocks. The marker data and the corresponding at least one auxiliary image with depth may be provided to a computer graphic (CG) rendering system to generate a CG image having one or more CG elements. The one or more CG elements may be based, at least in part, on the depth data of the corresponding auxiliary image with depth. Further to the operations, the CG elements may be composited with the corresponding at least one auxiliary image with depth to generate at least one representative output image.

In some implementations of the computer-readable storage medium the marker data may be determined to correspond with the at least one auxiliary image with depth, based, at least in part, on an exposure time of a camera capturing the corresponding images of the live action scene and an exposure time of the performance capture system. The determination of the marker data and the corresponding at least one auxiliary image with depth may also be based, at least in part, on an exposure time of at least one depth camera capturing at least one depth image to provide the depth data. Further, the live action images and the marker images may include time stamps which are used in the determination.

In some implementation, unique identifier may be generated for the marker data and the corresponding at least one auxiliary image with depth. The operation may be iteratively repeated to produce additional representative output images as additional live action images are captured of the live action scene.

Additional operations and details as described above for the computer-implemented method may be applied to the non-transitory computer-readable storage medium. A further understanding of the nature and the advantages of particular embodiments disclosed herein may be realized by reference to the remaining portions of the specification and the attached drawings.

DETAILED DESCRIPTION OF EMBODIMENTS

Figure 1:
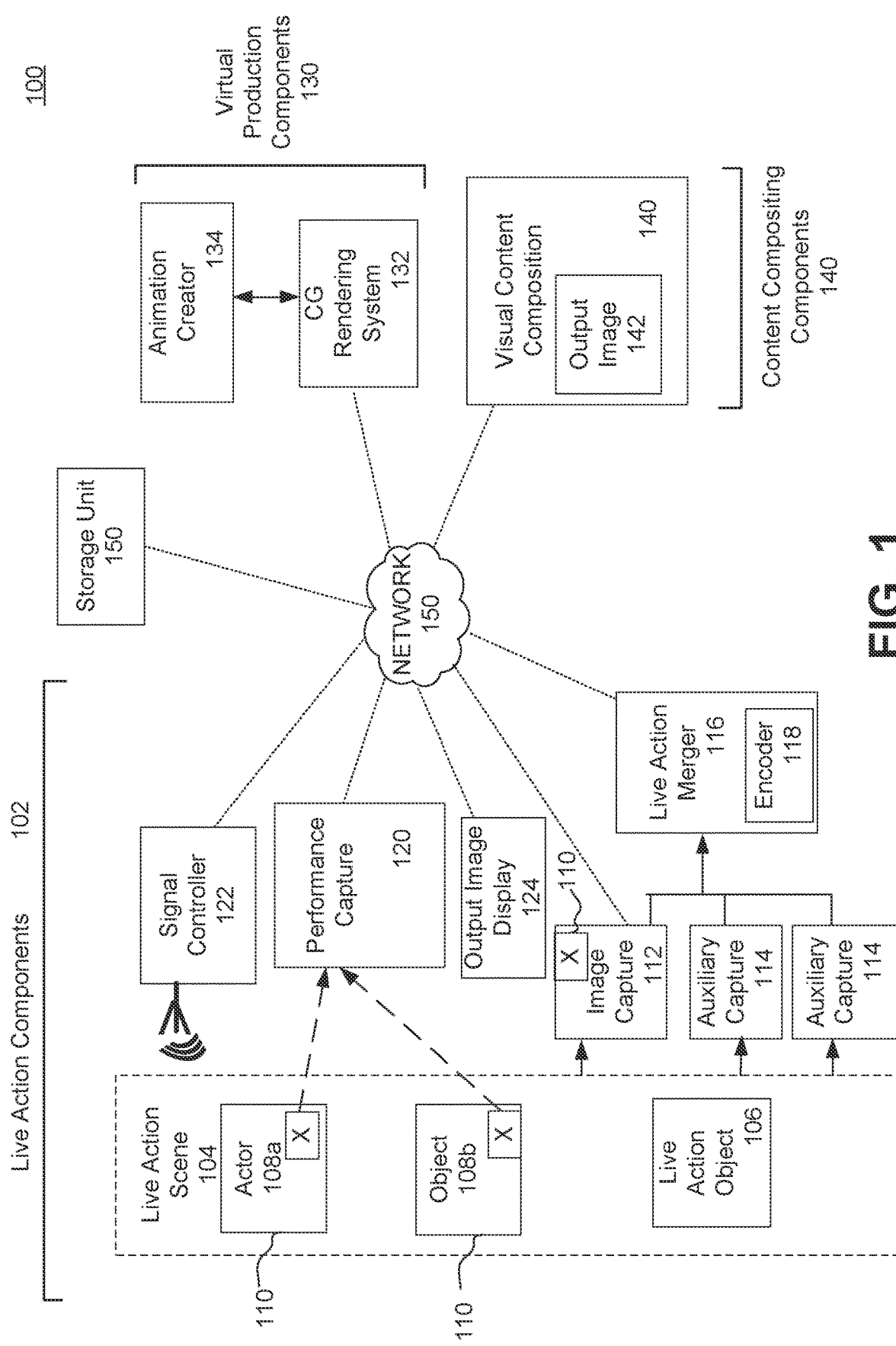
FIG. 1 is a block diagram of an exemplary compositing system for generating in real time composited images of visual elements for use in creating a visual production, in accordance with some implementations.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

The present compositing system of a visual content generation system is provided for compositing in real time, visual elements from different sources, including target objects and CG elements in a constant feed. The compositing system uses supplementary data, such as depth data of the target objects for integration with CG elements and light marker detection data for performance capture to produce composited output images that represent the final production images. The compositing system provides the output images to creators of a visual production while creators are making the production, e.g., during a live action shoot.

The compositing system syncs information, e.g., images and data, produced at various times from multiple sources, such as image capture devices at a live action scene, auxiliary cameras for depth data, performance capture system for marker data, and data stored in a production database. The composition system may identify corresponding images and data associated with particular time blocks and provide that information to the CG rendering system. For example, the corresponding images and data may be marked with an identifier that may be used to associate the corresponding images and data.

The compositing system uses the synched information to create CG elements that may be integrated with aspects of corresponding visual images or entirely replace the visual images with CG rendered elements. The compositing system creates the representative output images from the CG elements and the captured images of the live action scene. The representative output images are electronically sent to an output display at the live action scene during the production shoot.

In some implementations, the output image display device may be a dedicated device to show the representative output image, such as a handheld device, personal computer, or wearable computer device for an individual user. At times, the output image display may include a large screen, e.g., mounted screen, that is near the live action scene and viewable by one or more on-location users. The display device may also be integrated with one or more other cameras on location at the production shoot. For example, the display may include a split screen on a camera, e.g., a camera view finder, with one side depicting the presently captured live action image and the other side showing a representative output image. Other forms of display for presenting the output images at a live production shoot are possible.

As the representative output images are viewed, changes may be made to the production shoot based on the output images. Data in the production database may also be updated accordingly. The updated data may be marked to correspond with the appropriate images that reflect the changes during particular time blocks. The updated data may be pushed out in real time to user devices, e.g., animation creators, during the recording of the live action shoot so that the users can make adjustments as needed, such as changing CG elements based on the updated data.

The term, "real time" as used herein includes near real time and refers to simultaneous occurrences or occurrences substantially close in time such that they appear to be simultaneous. For example, composited output images may be received by a user in real time, such as within one to three frames, two to four frames, or one to five frames from the capturing of a corresponding live action image during a live action shoot. The term "frame" as used herein refers to images produced by the components of the visual content generation system, such as an image capture device, e.g., camera. Corresponding images from various components may represent a same frame number or matching frame for a particular moment in time in the live action scene, for example as captured by the image capture device.

A user of the composited output images might be a person who contributes to the making of the visual production, also referred to as a "creator". For example, the user may include an individual on-location at the live action shoot, such as a director, a cinematographer, an on-location crew member, an actor, a special effects person, etc. The user may also include an individual responsible for animation of the visual production, such as an artist, a graphics manager, etc.

The term "representative output image" refers to a composited image that is produced using various combinations of information from multiple sources, such as: (1) captured images of a live action scene, (2) depth data of objects depicted in the captured visual images, (3) performance capture marker data of objects in the captured visual images, and/or (4) CG elements. The generation of representative output images enables real time feedback of information during a video production shoot. The representative output image may be at least a close representation of a final production image used in the visual production.

CG items created prior to a live action shoot, without the benefit of information from the live action shoot, may appear out of place in the visual production. If interaction between a live actor and CG character is incorrect at the time of the shooting, the live actor may need to repeat the scene in additional takes, or the CG character may need to be altered in post shooting production. Real-time processing to composite the CG with live action is often difficult due to, at least in part, large amounts of data involved that may be generated from various devices and at different speeds.

By a director of a visual production having a view of what CG elements look like in the context of the scene as the shoot is happening, the director can change aspects of the shoot, such as dialog, lighting, and choreography, on the fly in response to the CG item. On-set access to representations of composited imagery further enables framing of a live scene to include CG characters of different sizes, e.g., gigantic and miniature characters, relative to the sizes of objects in the live scene.

Various types of supplemental information, such as depth data of target objects in an image, may enable CG imagery to be placed in various positions relative to the live actor. For example, a CG item may be produced and composited with a depiction of a target object in a same plane, in a foreground, or in a background relative to the target object. The depth data enables knowledge of which elements are in front and which are in back.

In illustration of an exemplary use of the compositing system of the visual content generation system according to one implementation, a movie clip is produced that includes a live actor being held in the hands of a gigantic CG robot, e.g., 40-60 feet tall. The live actor is initially depicted as being held in the foreground of the image, in front of the robot. As the robot turns around to face the back the CG robot is shown as still holding the live actor. As the CG robot rotates, the live actor appears in the images to gradually move into the background. The movie clip depicts the live actor passing behind the CG robot while the CG robot progressively covers the live actor.

At the time of producing the CG robot clip in the described illustration, a CG creator of the movie clip has access to depth data of the live actor showing her the distance of her placement in the scene from the camera, as well as marker information to indicate location and movement of a subject representing the CG robot in the live action scene. The CG robot can be created to change depth position relative to the depth of the live actor as the she passes behind the CG robot. In addition, a director of the live action scene can view the CG robot with the live actor during the shooting of the clip and make any necessary adjustments while the recording is ongoing.

Without the present compositing system with the compositing of depth data, when the live actor changes from the front side of the CG robot to the back side of the CG robot, the live actor may appear to remain in front of the CG robot. The CG robot would be see-through and the live actor would remain visible to a viewer of this distorted movie clip.

The compositing system provides flexibility in object positions. With prior technologies, such as use of green or blue screens and projecting CG images, e.g., chroma key, the CG image is fixed in the foreground relative to a location of a live actor or in the background. For example, with use of depth data by the compositing system, a green or blue screen may not be needed to combine CG images with live action images.

FIG. 1 is a block diagram of an exemplary compositing system 100 having various components including: live action components 102 for generating visual data from a live action scene 104; virtual production components 130 for generating CG graphic information; and content compositing components 140 for generating representative output images. The live action scene 104 defines the space available for recording and may include a motion production set, a performing stage, an event or activity, a natural outdoor environment, etc. Any of the system components may communicate with the other components through a network 150 or other data transfer technologies.

Live Action Components 102

The live action components 102 may include a variety of visual capture devices, including at least one image capture device 112 (also referred to as a picture camera) for capturing live action images of a target object 106 in the live action scene 104, one or more auxiliary capture devices 114, e.g., depth cameras, for capturing auxiliary images (depth images) for use in determining depth data, and a performance capture system 120 for capturing marker images. The image capture device 112 and auxiliary capture devices 114 may communicate with a live action merger system 116 to combine depth data with live action images. The performance capture system 120 is used by the compositing system for capturing movements of marker objects 108a, 108b by generating light information from markers 110 in the live action scene 102.

The performance capture system 120 may detect light from a plurality of markers 110. The markers 110 are light devices coupled to marker objects 108a, 108b in and/or adjacent to the live action scene 104 that emit and/or reflect light of particular wavelength ranges, e.g., infrared. The light is detected by the performance capture system 120, which determines the location and movement of the marker object or part of the marker object. The plurality of markers 110 are used as reference points of positions of the respective marker objects 108a, 108b in the live scene. The reference points may be used for replacement with computer generated items.

One or more markers may be attached directly to the object or attached to an item on the object, e.g., strap, clothing, shoe, hat, etc. A plurality of markers may be coupled to various parts of a marker object, such as a face, foot, or body to track how the object or part of the object moves in the scene. In some implementations, markers may be attached to a face of a live actor to detect facial expressions. Marker objects 108a, 108b may include performers, e.g., actors, items, e.g., props, etc., that are intended to be replaced, in whole or in part, with CG elements in output images 142. Marker data representing the location and/or position of the various markers may be extracted from the marker images. The marker data may also include time code data. In some implementations, the marker data may include packets of data related by time, in which each packet includes location and/or position data for one or more markers captured during a particular time. One or more data packets may be determined to correspond with depth data of one or more auxiliary images with depth representing a particular moment in time in the live action scene. The marker data may be transmitted, such as through network 150 to the CG rendering system 132 and/or to an animation creator 134.

In some implementations, the image capture device 112 that may be coupled to one or more markers 110. The image capture device location may be tracked through the attached markers as the image capture device 112 captures the live action scene 104. Marker data from markers on the image capture device 112 may include location and/or position information of the marker(s) in the image capture device relative to the performance capture system. Such marker data obtained from markers 110 on the image capture device 112 may offer additional information about the live action images, be supplied to the CG rendering system for animation purposes, assist in calibration of devices, be used to reposition the image capture device, and/or be employed for other purposes in the creation of the visual production.

In some implementations, the plurality of markers 110 include active markers that emit infrared and/or visible light, or reflective markers that reflect received light, and combinations of thereof. The light emitted by the active marker may be any frequency of electromagnetic radiation. Markers 110 may additionally be used to pre-calibrate various devices of the compositing system 100. The pulse rate of the light may be calibrated to be consistent with the detection camera exposure time so that light is emitted only when the camera shutter is open. In some implementations, the light may be emitted at regular and even intervals during the duration of the camera exposure time.

The active marker may include a plurality of LED's, e.g., a bundle of three LED's. The light source may emit infrared light. In some implementations, a different wavelength of light or filters may be used for various conditions, such as blue wavelength light for underwater scenes. The active marker may include one or more light sources in a receptacle, e.g., a housing, that may include an inlet/outlet interface for receiving signals and sending data, and a battery. The active marker receptacle may be any shape that permits emission of light, such as a hemisphere or sphere shape.

The active marker may provide benefits in sensitivity and reduced energy requirements over traditional reflective markers. For example, when using reflective markers in an outdoors scene, environmental light may interfere with detection of the reflected visible light. The active marker does not experience such extensive distortion of received light. In addition, the active marker may use less power than reflective markers because light is only required to travel one way from the marker to detection camera, rather than two-ways to the marker and reflected back.

In infrared marker systems, the performance capture system 120 may be a camera that includes a visible light filter to block visible light and allow only infrared wavelength light to be detected by the camera sensor. In some implementations, the performance capture system 120 may be computer vision cameras and mono cameras that are sensitive to infrared light, e.g., that exclude infrared blocking filters, or other light sensors.

The performance capture system 120 feeds at least a portion of the marker data obtained from the detection of the markers 110 to the CG rendering system 132 to be mapped to a virtual model using software of the CG rendering system 132. For example, marker data positioned on particular objects in the live action scene may be transmitted to the CG rendering system for creation of animation. The CG rendering system 132 may represent the selected markers 110 in a virtual environment. For real time performance, the performance capture system 120 may operate at a high rate, such as 120 frames per second ("fps").

In some implementations, signal controller 122 may release signals to direct an action by the system components such that the compositing system 100 components drive capture by one or more a sensor device, e.g., a camera, of the performance capture system 120, configured to capture at least one particular wavelength light from the active markers, at the same time. In some implementations, signal controller 122 communicates with markers 110 to emit light for the performance capture system 120, as described below with regards to an "active marker." In some implementations, the signal controller 122 emits radio frequency signals to receivers on various components, such as the markers 110, as further described below.

In some implementations, device parameter data from the image capture device may be accessed in the central storage unit 150 and used to match CG parameters for CG elements in CG images with image capture device parameters, such as perspective, position, focal length, aperture, and magnification, of the CG images. In this manner the CG images may be created in an appropriate spatial relationship with the target objects 106. The image capture device 112 captures live action images from the live action scene 104. The image capture device can be any type of camera for digital cinematography capturing of live action shots, such as professional high end digital cameras or low-end consumer cameras for digital cinematography. The image capture device 112 can capture images using different camera parameters. Parameters may include resolution (e.g., 2.7K and 4K), frame rate (e.g., 24 fps, 48 fps, 60 fps and 120 fps), exposure rate (e.g., $1/50^{th}$, $1/100^{th}$, $1/120^{th}$), International Standards Organization (ISO) setting, viewing angle (e.g., 180 degrees), etc.

The central storage 150 (also referred to as "central storage unit") includes dynamic storage of data, e.g., production information, related to a particular production shoot, e.g., capture device parameters (such as perspective, position, focal length, aperture, and magnification), identification of objects in the live action scene (including actors playing particular roles) and their part in the scene, call sheets, identification of performance capture markers, marker locations, etc. The central storage may include one or more databases for organizing and retrieval of the stored data.

The auxiliary capture device 114 captures auxiliary images of the live action scene 104 that correspond with live action images of the image capture device 112. For example, one or more auxiliary capture devices, e.g., depth cameras, may be positioned to flank the image capture device and captures auxiliary images of one or more of the same target objects captured by the image capture device at the same time or substantially the same time (e.g., slightly after) that the image capture device captures corresponding images of the target objects in the live action scene. In some implementations, the one or more auxiliary capture devices 114 may include sensors and/or lenses attached to or integrated with the image capture device 112.

The auxiliary images are used by the live action merger system 116 to obtain depth data for pixels in the corresponding live action images, for example to generate depth data for target objects 106 in the live action scene 104. The auxiliary capture device 114 may capture the same or similar auxiliary images from the live action scene 104 as the live action images captured by the image capture device 112.

Depth data may include a depth value for a plurality of pixels of the corresponding live action image, and a depth map created with the depth values. For example, each pixel of the corresponding live action image may be associated with a depth value. The depth value is a distance between the image capture device position and a plane that is perpendicular to a viewing direction of the image capture device 112, e.g., direction of image capture device lens. However, in some implementations, the depth value may be referenced from a different camera, rather than the image capture device, and may be calculated to a desired plane or point. The depth values may be used to create a depth map. The depth map may be at the same as or higher resolution than the live action image so that it can be mapped to the live action image to generate an auxiliary image with depth and provide a depth for pixels in the live action image.

The auxiliary capture device 114 may include a stereo depth camera system having a pair of depth sensors, e.g., "left" and "right" cameras, and to calculate stereo depth data per pixel in the live action images and to determine depth of target objects 106. Thus, the auxiliary capture device 114 may include any number of cameras, such as two cameras with depth sensors. In some implementations, other approaches to obtain depth data may be used. For example, structured light, time-of-flight, photogrammetry, etc. techniques may be employed.

The auxiliary capture device 114 may have certain operating parameters that are considered for operation under diverse live action scenes. For example, auxiliary capture device 114 may be operated to be robust under low lighting scenes, reduce motion blur, produce satisfactory resolutions, function within required distance ranges, etc. The sensors of the auxiliary capture device may be adjusted to detect depth at a various distances. For example, by widening the distance between the sensors, longer depth distances may be detected and by narrowing distance between the sensors, shorter depth distances may be detected. Longer distance ranges may result in less resolution. In some implementations the resolution of auxiliary images of the auxiliary capture device may be the same resolution as the live action images of the image capture device, such as standard 2K resolution, or greater resolution than the live action images.

The auxiliary capture device 114 may be configured to detect depth within a specific distance range, such as half of a meter to five meters, half of a meter to ten meters, etc. If a subject target object that is being tracked by the auxiliary capture device 114 moves outside of the designated distance range, the distance of the subject target object may not be detectable by the auxiliary capture device 114, which may persist even if the subject target object moves back within the designated distance range.

Although the auxiliary capture device 114 is described for convenience as a camera dedicated to obtaining depth data and that is distinct from the image capture device 112, in some implementations, the depth data may be computed from any sensor device, including the image capture device 112.

Live images of objects in the live action scene from an image capture device 112 and depth data, e.g., depth maps from the auxiliary capture device 114, may be merged by live action merger system 116 to produce auxiliary images with depth. Auxiliary images with depth may include a live action image integrated with corresponding depth maps. The resulting image data may be compressed by an encoder 118 that may be part of the live action merger system 116 or a separate encoder device. The auxiliary images with depth may be integrated (also referred to as "composited") with CG data via virtual production components described below, to produce representative output images for viewing during the live action shoot.

An output image display device 124 at the live action shoot may be provided to show the representative output images in real time. The representative output images may be viewed by users, such as creators on location at the live action shoot. For example, a director may view the displayed representative images to determine on the fly whether any changes are needed with the actors, props or set.

In some implementations, the output image display 124 may be a dedicated device, e.g., standalone device, to show the representative output image, such as a handheld device, personal computer, or wearable computer device for an individual user. In some instances, the output image display may include a large screen, e.g., mounted screen, that is near the live action scene and viewable by one or more on-location users. In some implementations, the output image display device 124 may be integrated with one or more other cameras on location at the production shoot, e.g., image capture cameras, auxiliary capture devices, performance capture system, etc. For example, the output image display device 124 may include a split screen on a camera, e.g., a camera view finder, with one side depicting the presently captured live action image and the other side showing a representative output image.

Virtual Production Components

An animation creator 134 is used, e.g., by artists and other users, to specify details, programmatically and/or interactively, of CG elements to be generated by the CG rendering system 132. In some implementations, the CG elements are constructed by the animation creator 134 in real time with the shooting of the live scene and while receiving auxiliary images with depth and/or performance capture images.

Real time creating of CG elements with use of the auxiliary images with depth and corresponding performance capture images enables tailoring of the CG elements to the corresponding live scene to create a realistic spatial and timing relationship between CG elements and target objects. By contrast, when CG elements are created and recorded during a pre-production stage, the CG elements are played back with the live elements and marker objects are replaced with the CG elements. However, the characteristics of pre-productions CG elements may be locked-in such that changes in the live action scene 104 may create a mismatch with the CG elements. Distorted views of the CG elements in context of the live action shoot, such as timing changes in the live scene, may require post-production editing of CG elements or further takes of the live action shoot.

The animation creator 134 and CG rendering system 132 may include computer processing capabilities, image processing capabilities, one or more processors, program code storage for storing program instructions executable by the one or more processors, as well as user input devices and user output devices, not all of which are shown in FIG. 1.

The CG rendering system 132 may receive the auxiliary image with depth from the live action merger system through network 150 and decompress encoded image data. The CG rendering system may produce CG elements that complement features of the live action scene 104. For example, the CG rendering system 132 may determine lighting, shadowing, and shading that are consistent with the features of the live action scene 104 as provided in the auxiliary image with depth. With real-time feeding of live action data to the CG rendering system 132, creators of the live action shots can change compositional aspects of a shot, such as lighting, focal length, e.g., zoom, on the fly and in response, the animation creator 134 and/or the CG rendering system can make real time adjustments in the CG images. For example, CG elements may be adjusted to maintain focus and proper lighting in the output images 142. With the depth data of the target objects provided by the auxiliary image with depth, the CG rendering system 132 may determine characteristics needed in the CG image to create a realistic appearance to an extent specified by the visual production. For example, if a light source, e.g., the sun, is located behind a CG element, the CG system may include in the CG image, a shadow made by the CG element. Similarly, the live shot creators may adjust light position and intensity on the set to match with CG images to assist in a realistic appearance.

In some implementations at least one central storage unit 150 maintains production information, such as in one or more production databases Production information includes data related to a particular production shoot. Such information may include capture device parameters (such as perspective, position, focal length, aperture, and magnification) that are employed during capturing of particular images. Production information may also include object information related to objects in a live action scene, such as identification of target objects in the live action scene and their part in the scene, types of target objects, call sheets, identification of performance capture markers, marker locations, unique identifiers of corresponding images and data, etc. For example, production information may include records of target objects and/or CG elements in the scene. There may be numerous target objects and CG elements scripted to be in a photo shoot that is required to be tracked. Real time tracking of updates of the production information is a valuable asset in streamlining the creation of a visual production. Production information may further include identifiers of corresponding images and data, as described below.

Use of the central storage unit may conserve resources that may be otherwise necessary if each component of the compositing system 100 is required to determine, store, and track the production information. For example, the performance capture system 120 may access and use production information to identify the live action actors and assist in identifying marker locations. In another example, the CG system may access and use production information identifying CG elements for creating of the CG elements and integrating CG elements with target objects.

The storage unit 150 may be dynamically updated, e.g., during scheduled intervals or when objects/elements associated with the production information have been changed. The updated production information may replace existing information. In some implementations, the updated production information may be added and marked as current production information, so as to maintain a history of the prior outdated production information. In this manner, a creator of the visual production may opt to undo the update to return to the prior production information or otherwise refer to the outdated information.

The central storage unit 150 may be configured to receive updated production information from the various components of the compositing system 100 and/or via other components, e.g., computing devices used in direct communication with the central storage unit 150. Updated production information may reflect alterations made in response to one or more users viewing the display of the representative output image. Such updates to production information may be made on the fly during the live action shoot as the representative output image is viewed by users. The updates may be pushed out in real time to components of the compositing system 100.

In some implementations, the CG rendering system 132 may segment CG elements of a CG rendering intended for an output image 142. Individual CG elements or any combination of CG elements may be rendered as separate respective CG images. Multiple CG images, such as three to four CG images, may be merged in generating the output image 142.

In some implementations, particular CG elements may be excluded from the representative output image and added in post-production editing for generate a final output image for inclusion in the visual production. For example, if a live actor is wearing virtual glasses and takes the virtual glasses off, the glasses may be added into the representative output image. However, reflections on the glasses may be added in post-production to produce a realistic look.

Content Compositing Components

A visual content composition system 140 may sync information, e.g., images and data, produced at various times from multiple components of the compositing system 100, such as image capture devices 112 at a live action scene, auxiliary capture devices 114 for depth data, performance capture system 120 for marker data, and production information stored in the central storage unit 150. The visual content composition system may identify corresponding images and data associated with particular time blocks. The visual content composition system 140 may provide the identification information to various components, e.g., the CG rendering system 132. For example, corresponding images and data may be marked with a unique identifier that may be used to associate the corresponding images and data, e.g., associated with metadata that includes the identifier.

The auxiliary images with depth from the live action merger system 116 and CG elements from CG rendering system 132 may be fed to the visual content composition system 140 for integration by a live composition application. The visual content composition system 140 matches CG images having the CG elements, with the auxiliary image with depth to overlay the CG view and live action view on top of each other and generate representative output images 142, while the live action scene 104 is in motion. The representative output image 142 is rich in detail from the use of the supplemental data in the composing of the representative output image 142. In some implementations, more than one CG image is provided and each CG image has a different CG element, e.g., CG item. Multiple CG images may be composited with an auxiliary image with depth by the visual content composition system 140 determining pixel locations for each of the different CG elements. For example, particular pixels of the auxiliary image with depth may be replaced with particular pixels in the CG image. Aligning of the CG image data and the auxiliary image with depth also includes synchronization of frames and data as the images are produced.

The compositing process by the visual content composition system 140 is performed in real-time such that each frame is composited and ready for display at a standard frame rate being used for playback (e.g., 30 or 24 fps, etc.). It is desirable to reduce any delay between an image acquisition and display of a composited output image. In some implementations the rate of the compositing process is the same as the image capture device 112 frame rate. Rate of the compositing process may depend on various rate specifying factors, such as a rate that the hardware (e.g., camera) supports, broadcast standards, and particular affects required by the particular visual production. In some implementations, frames may be skipped, or dropped, or the compositing modified to be slower for some of the images than real time, while still achieving desired functionality.

The visual content composition system 140 is a representation of various computing resources that can be used to perform the process actions and steps described herein. Any number and type of discrete or integrated hardware and software components may be used. The components may be located local to, or remote from the other system components, for example, interlinked by one or more networks 150.

The network 150 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long-term evolution (LTE) network), routers, hubs, switches, server computers, or a combination thereof.

In some implementations, the visual content composition system 140 renders the representative output image for real time feedback information. The representative output image may be rendered at a particular rate for display, such as 24 fps or 30 fps. In some implementations, the visual content composition system 140 is dedicated to produce the representative output image 142 and a different renderer produces a final output image that is included as content in a final visual production.

The representative output image 142 may be substantially similar as the final production image or may be the same as the final production image. For example, the representative output image 142 may undergo final adjustments and editing prior to finalizing the image.

The representative output image 142 may be provided to a live actor creator, such as a director, through the output image display device 124 having a display screen. The representative output image may be displayed in a 2-D or 3D format. In some implementations, the representative output image 142 may be provided to a view finder of the output image display device 124 during the live action shoot. For example, a display on the image capture device may show the representative output image 142 during the production shoot. In some implementations, an on-location user, e.g., a director of the production shoot, may view both the representative output image 142 and the live action image being captured by the image capture device 112 during the production shoot. For example, the output image display may be a split screen with one side depicting the presently captured live action image and the other side showing the representative output image. However, the director may choose to focus attention onto the representative output image 142 because the live action image may provide insufficient detail for the director. The live action image lacks the CG elements. In some implementations, the output image display device 124 may be a dedicated display device for the representative output image, such as a handheld device, personal computer, or wearable computer device for an individual user, or may include a large screen, e.g., mounted screen, that is near the live action scene and viewable by one or more on-location users, The image capture device 112, auxiliary capture device 114, and performance capture system 120 may have different lengths of time in which the respective sensors of the individual devices are exposed to light to capture images. The encoder 118 also may process auxiliary images with depth at a particular rate. As a result of the different exposure and processing times, the arrival times in which the respective images are received by the downstream components in the composition process varies accordingly. In order to align corresponding images, the compositing system 100 may account for the image arrival times.

In some implementations, the storage unit 150 may include a checker-board type of chart or other data structures for storing, organizing, and comparing image parameters that may be used to synchronize images, such as images from the image capture device 112 and auxiliary capture device 114 may be synchronized. The storage unit may include the identifier of corresponding images with the production information to associate production information with the corresponding images. Updated production information may include changes to capture device parameters or object information associated with auxiliary images with depth currently or recently received by the visual content composition system.

Updating of the production information in the central storage unit 150 may trigger pushing out of the updated production information to the visual content composition system and/or other components. In some implementations, a notification of the updates may be sent to the components and the notification triggers the components to access the stored updates.

Figure 2:
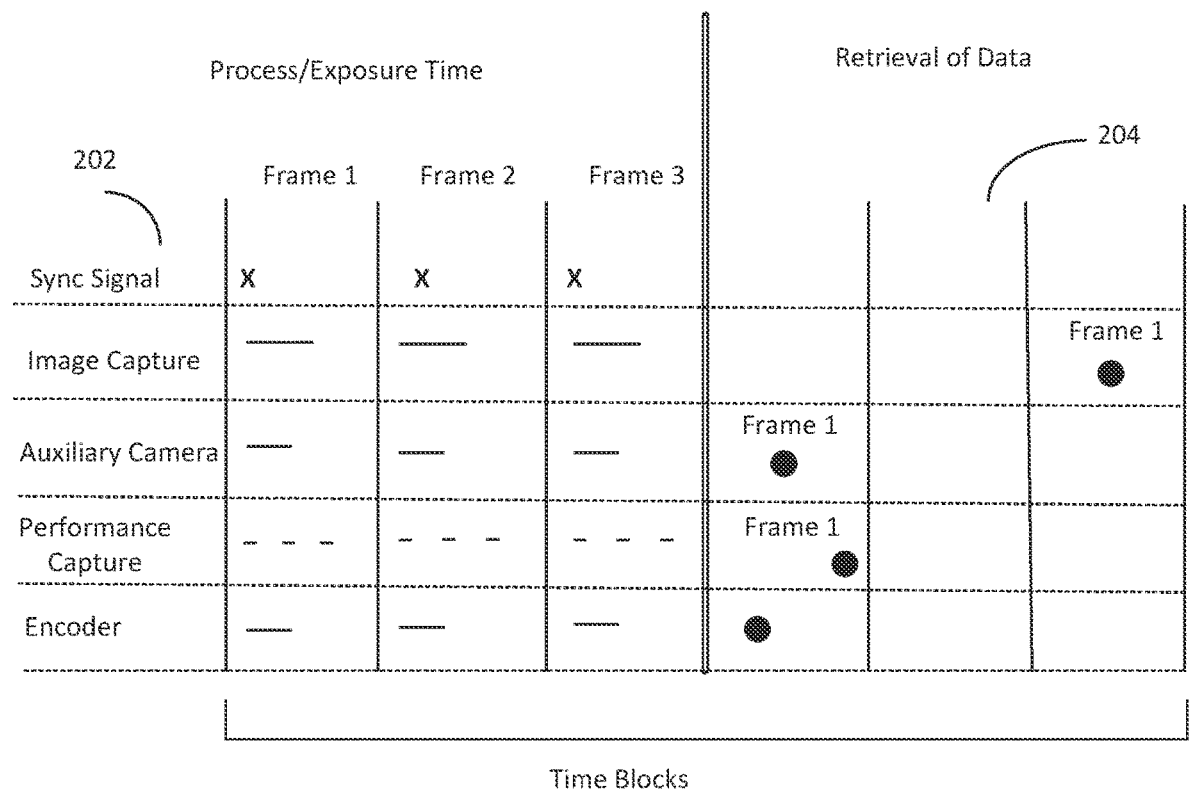
FIG. 2 is a table of example timing data of devices for use in aligning visual data received by various receiving components of the compositing system, in accordance with some implementations.

FIG. 2 is a data table 200 with a first part showing exemplary exposure times for frame capture by visual capture devices and processing time for encoder 118 of the compositing system 100 and a second part showing retrieval of data times from the same visual capture devices and encoder to the downstream receiving components of the compositing system 100. The table illustrates the difference in timing of each visual capture device for use in aligning visual data received by various receiving components of the compositing system 100 from the visual capture devices in creating the representative output image 142. The rows 202 of table 200 represent individual devices and each column 204 represents a block or length of time.

As shown in FIG. 2, the image capture device 112, auxiliary camera 114, and performance capture system 120 may have different lengths of time in which the respective sensors of the individual devices are exposed to light to capture images. The encoder 118 also may process auxiliary images with depth at a particular rate. As a result of the different exposure and processing times, the time in which the respective images are received by the downstream components in the composition process varies accordingly. In order to align corresponding images, the compositing system 1 may account for the image arrival times.

For illustration purposes, the image capture device may use an exposure rate that is about half of a block of time (e.g., $\frac{1}{48}$ second) and the auxiliary camera may use an exposure rate that is about a quarter of a time block (e.g., $\frac{1}{100}^{th}$ second). The performance capture system may use short exposure rates, such as about a tenth of the auxiliary camera time (e.g., $\frac{1}{1000}^{th}$ second). The performance capture system may take several marker images, also referred to as "samples," within the same time span that the image capture device 112 and auxiliary camera 114 captures an image.

In some implementations, the auxiliary camera 114 may have an exposure time, which may be shorter than the exposure time of the image capture device 112, e.g., auxiliary camera at $\frac{1}{100}^{th}$ second and image capture device at $\frac{1}{48}^{th}$ second. The depth information from the auxiliary camera 114 may be received by the live action merger system 116 earlier than the live action images from the image capture device 112. The live action merger system 116 needs to track and account for the different receiving times.

The encoder 118 may compress the auxiliary image with depth data at a fast rate to transmit the information to the CG rendering system 132 and visual content composition system 140.

In order to align the corresponding incoming visual data from its various sources, holding times in a number of frames may be determined for the particular capture and processing devices. For example, the CG rendering may be configured to delay processing of CG images, e.g., hold one to three frames, for slower frame rates of an image capture camera. For example, auxiliary image with depth from the live action merger system 116 may be one and a half to three and a half frames lag in being received by the visual content composition system 140.

In some examples, the image capture device may enable faster frame rates such that there is little to no latency in the sending the live action images to the live action merger system 116, which results in reduced latency in sending auxiliary images with depth to the downstream components, such as the encoder 118, CG rendering system 132 and visual content composition system 140.

In some implementations time stamps may be associated with the images and used to track images and to match corresponding images, e.g., timecode metadata, such as SMPTE (Society of Motion Picture and Television Engineers). In some implementations, a time stamp may be added at the time of capture to images by the capture device, such as the image capture device 112 and performance capture system 120 (as shown in FIG. 1). In some implementations, time stamps may be added by the downstream receiving device at the time or receipt of the image instead of or in addition to timecodes added by the capture device. For example, when auxiliary images from the auxiliary camera are captured quickly, the visual content merger system 116 may add the timecodes as the auxiliary images arrive, instead of or in addition to timecodes being added by capture devices and the receiving timecodes may correlate to a capture time.

In some implementations, aligning the visual data by timestamps, e.g., timecodes, from the capture devices alone may result in inaccurate alignment, due, at least in part, to the different exposure times of the capture devices. For example, the performance capture system may operate at high speeds such that more than one frame (e.g., 2 frames) is stamped with a same time code.

The components of the compositing system 100 may use processing times and other camera parameters to determine matching frames received from upstream components. Exposure times and/or frame rates of the various cameras may be used to calculate expected arrival times for respective images at a receiving component and to identify corresponding images. For example, live action images of an image capture device 112 having an exposure time of $\frac{1}{48}$ second may be expected to arrive at the live action merger system 116 slower than an auxiliary camera 116 that has an exposure time of $\frac{1}{100}^{th}$ second. The respective image arrival times are determined and images matched to create an auxiliary image with depth. Images and/or data arrive at the CG rendering system 132 from upstream components, including the performance capture system 120 and the live action merger system 116 and/or encoder 118. When the performance capture system 120 has an exposure time of $\frac{1}{1000}^{th}$ second, marker data from marker images may be associated with an expected arrival time sooner than auxiliary images with depth arriving from the live action merger system 116 and/or encoder 118. The different expected arrival times are calculated and corresponding images may be tagged, e.g., identifier, accordingly.

In some implementations, a table, database, or other data structures for storing, organizing, and comparing image parameters may be used to synchronize images, such as images from the image capture device 112 and auxiliary camera 114 may be synchronized. Compositing system 100 determines relationships between the various cameras. In this manner, each camera does need not capture the same images at all times. The compositing system 100 considers the different capture and processing times of the various cameras. Synchronization is dynamic such that as the capturing of images of the live action scene changes, the components of the compositing system 100 can adjust. For example, the live action merger system 116 may synchronize images as the image capture device changes zoom levels, for example, to project a corresponding depth map. Accordingly, the CG rendering system can also synchronize with the auxiliary images with depth from the live scene.

Figure 3:
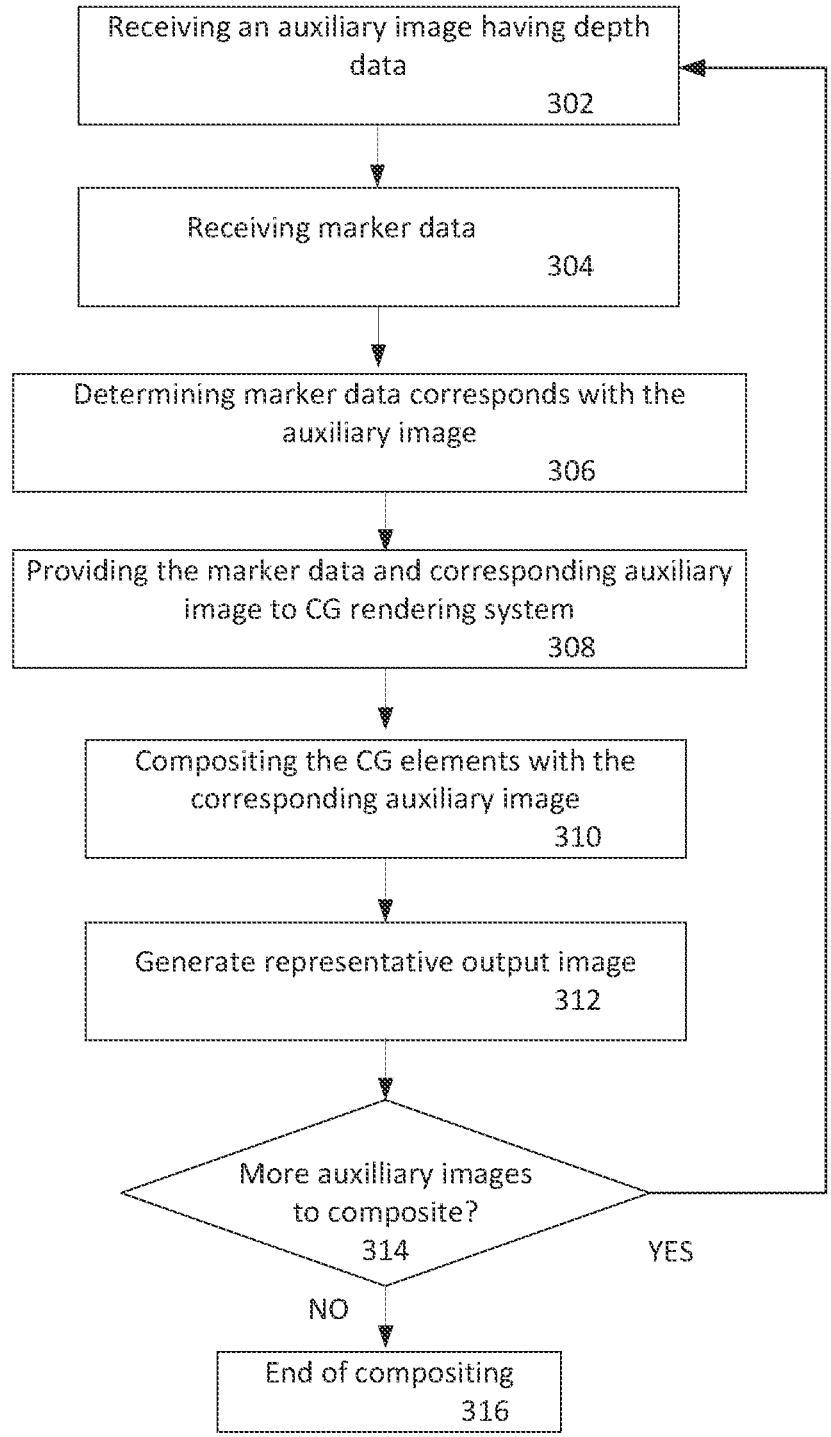
FIG. 3 is a flowchart of an example process for real time correlating data and images from a live action scene, in accordance with some implementations.

FIG. 3 is a flowchart showing an example method 300 for real time correlating of data from multiple sources associated with shooting of a live action scene, for example, by the visual content composition system 140.

In block 302, the system receives an auxiliary image with depth. The auxiliary image with depth is generated by the live action merger system 116, as described above with regard to FIG. 1. The time that the auxiliary image with depth is received may be based on the auxiliary capture device parameters, image capture device parameters, and/or processing time of the live action merger system 116.

In block 304, the marker data from one or more marker images are received. The marker data are generated by the performance capture system 120 from marker images captured by the performance capture system 120, as described above with regard to FIG. 1. The time that the marker data are received may be based on capture parameters of the one or more sensor devices of the performance capture system and/or processing times of the performance capture system 120, for example to extract location and position data from the marker images.

In block 306, it is determined that marker data from at least one marker image corresponds with at least one of the auxiliary images with depth. In some implementations, more than one set of marker data from marker images are associated with a same time code. By syncing the parameters, such as processing and capture times, of various device components, the system may select the marker data that most accurately represents the live action scene at a time captured in a corresponding auxiliary image.

In block 308, the corresponding marker image and auxiliary image with depth are provided to CG rendering system for use in producing CG elements and/or CG images, as described above.

In block 310, the CG elements are composited with the corresponding auxiliary image with depth, as described above.

In block 312, the representative output image is generated. The representative output image may be provided for display at output image display device 124, as described above.

In decision block 314 it is determined whether there are more auxiliary images with depth to composite with CG elements. If there are more auxiliary images with depth that require compositing with CG elements, the process returns to block 302 to receive the next auxiliary image with depth. Otherwise, if there are no more auxiliary images with depth that need compositing, the process continues to block 316 to end compositing.

Computer Device

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 4:
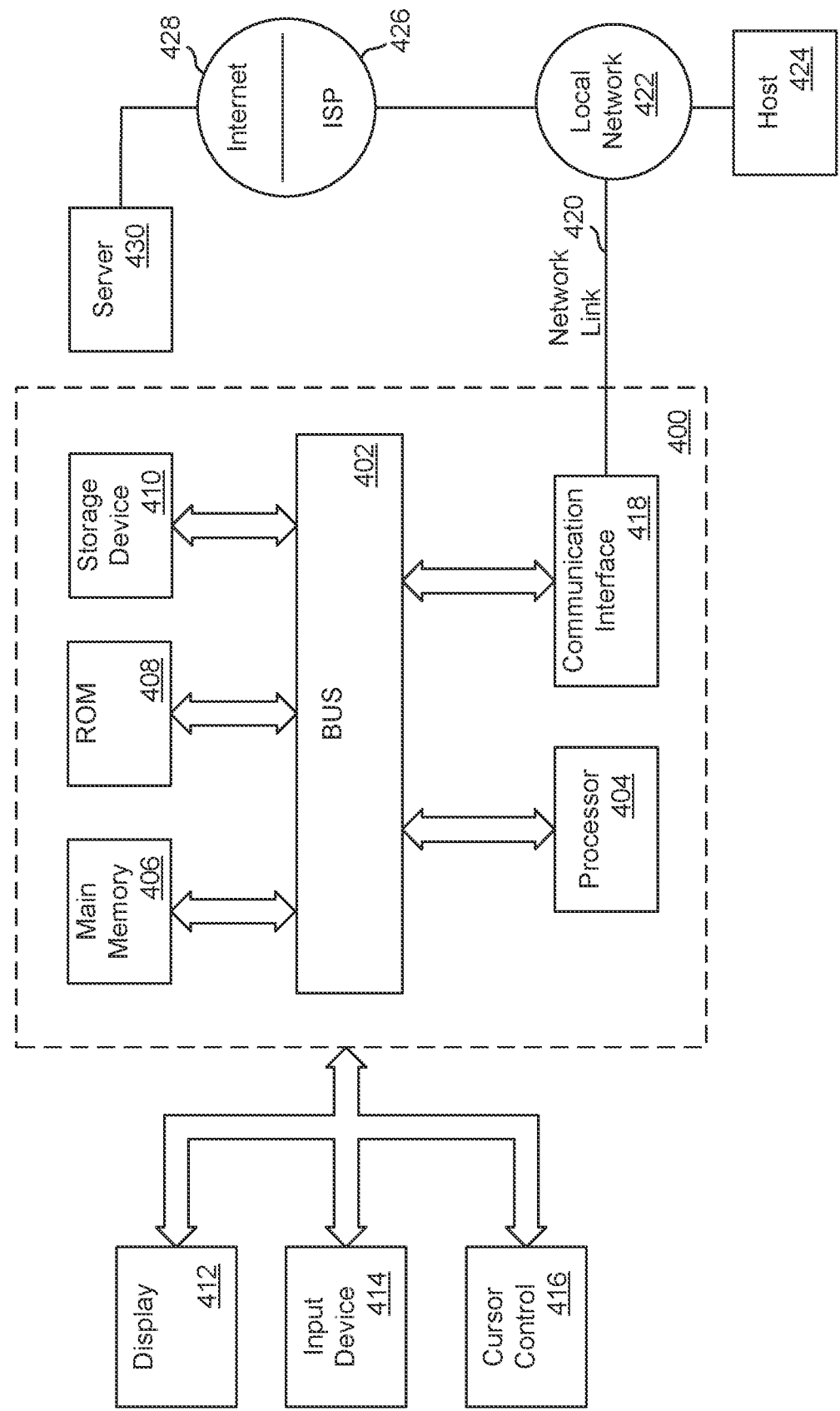
FIG. 4 is a block diagram illustrating an example computer system upon which computer systems of the systems illustrated in FIGS. 1 and 5 may be implemented.

For example, FIG. 4 is a block diagram that illustrates a computer system 400 upon which the computer system(s) of the visual content composition system 140 of FIG. 1, may be implemented. The computer system 300 includes a bus 402 or other communication mechanism for communicating information, and a processor 404 coupled with the bus 402 for processing information. The processor 404 may be, for example, a general purpose microprocessor.

The computer system 400 also includes a main memory 406, such as a random access memory (RAM) or other dynamic storage device, coupled to the bus 402 for storing information and instructions to be executed by the processor 404. The main memory 406 may also be used for storing temporary variables or other intermediate information during execution of instructions to be executed by the processor 404. Such instructions, when stored in non-transitory storage media accessible to the processor 404, render the computer system 400 into a special-purpose machine that is customized to perform the operations specified in the instructions.

The computer system 400 further includes a read only memory (ROM) 408 or other static storage device coupled to the bus 402 for storing static information and instructions for the processor 304. A storage device 410, such as a magnetic disk or optical disk, is provided and coupled to the bus 402 for storing information and instructions.

The computer system 400 may be coupled via the bus 402 to a display 412, such as a computer monitor, for displaying information to a computer user. An input device 414, including alphanumeric and other keys, is coupled to the bus 402 for communicating information and command selections to the processor 404. Another type of user input device is a cursor control 416, such as a mouse, a trackball, or cursor direction keys for communicating direction information and command selections to the processor 404 and for controlling cursor movement on the display 412. This input device typically has two degrees of freedom in two axes, a first axis (e.g., x) and a second axis (e.g., y), that allows the device to specify positions in a plane.

The computer system 400 may implement the techniques described herein using customized hard-wired logic, one or more ASICs or FPGAs, firmware and/or program logic which in combination with the computer system causes or programs the computer system 4300 to be a special-purpose machine. According to one embodiment, the techniques herein are performed by the computer system 400 in response to the processor 404 executing one or more sequences of one or more instructions contained in the main memory 406. Such instructions may be read into the main memory 406 from another storage medium, such as the storage device 410. Execution of the sequences of instructions contained in the main memory 406 causes the processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 410. Volatile media includes dynamic memory, such as the main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire, and fiber optics, including the wires that include the bus 402. Transmission media can also take the form of acoustic or light waves, such as those generated during radio-wave and infrared data communications.

Various forms of media may be involved in carrying one or more sequences of one or more instructions to the processor 404 for execution. For example, the instructions may initially be carried on a magnetic disk or solid state drive of a remote computer. The remote computer can load the instructions into its dynamic memory and send the instructions over a network connection. A modem or network interface local to the computer system 400 can receive the data. The bus 402 carries the data to the main memory 406, from which the processor 404 retrieves and executes the instructions. The instructions received by the main memory 406 may optionally be stored on the storage device 410 either before or after execution by the processor 404.

The computer system 400 also includes a communication interface 418 coupled to the bus 402. The communication interface 418 provides a two-way data communication coupling to a network link 320 that is connected to a local network 422. For example, the communication interface 418 may be an integrated services digital network (ISDN) card, cable modem, satellite modem, or a modem to provide a data communication connection to a corresponding type of telephone line. Wireless links may also be implemented. In any such implementation, the communication interface 418 sends and receives electrical, electromagnetic, or optical signals that carry digital data streams representing various types of information.

The network link 420 typically provides data communication through one or more networks to other data devices. For example, the network link 420 may provide a connection through the local network 422 to a host computer 424 or to data equipment operated by an Internet Service Provider (ISP) 326. The ISP 426 in turn provides data communication services through the worldwide packet data communication network now commonly referred to as the "Internet" 428. The local network 422 and Internet 428 both use electrical, electromagnetic, or optical signals that carry digital data streams. The signals through the various networks and the signals on the network link 420 and through the communication interface 418, which carry the digital data to and from the computer system 400, are example forms of transmission media.

The computer system 400 can send messages and receive data, including program code, through the network(s), the network link 420, and communication interface 418. In the Internet example, a server 430 might transmit a requested code for an application program through the Internet 428, ISP 426, local network 422, and communication interface 418. The received code may be executed by the processor 404 as it is received, and/or stored in the storage device 410, or other non-volatile storage for later execution.

Figure 5:
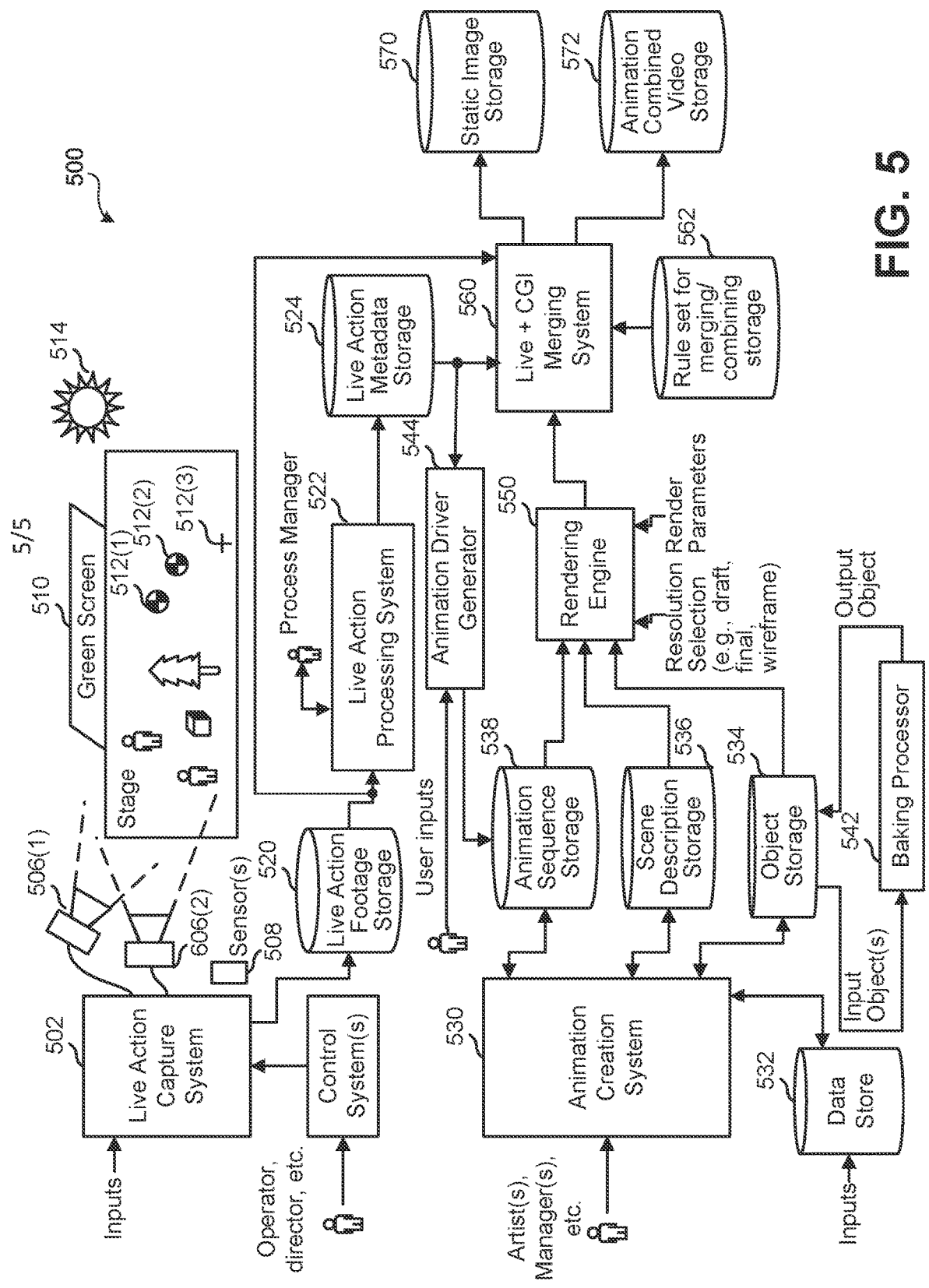
FIG. 5 illustrates an example visual content generation system as might be used to generate imagery in the form of still images and/or video sequences of images with some implementations.

FIG. 5 illustrates the example visual content generation system 500 as might be used to generate imagery in the form of still images and/or video sequences of images, in which the real time composition system 100 may be used. The visual content generation system 500 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 500 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 5, a live action capture system 502 captures a live scene that plays out on a stage 504. The live action capture system 502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 506(1) and 506(2) capture the scene, while in some systems, there might be other sensor(s) 508 that capture information from the live scene (e.g., infrared cameras, infrared sensors, motion capture ("mo-cap") detectors, etc.). On the stage 504, there might be human actors, animal actors, inanimate objects, background objects, and possibly an object such as a green screen 510 that is designed to be captured in a live scene recording in such a way that it is easily overlaid with computer-generated imagery. The stage 504 might also contain objects that serve as fiducials, such as fiducials 512(1)-(3), that might be used post-capture to determine where an object was during capture. A live action scene might be illuminated by one or more lights, such as an overhead light 514.

During or following the capture of a live action scene, the live action capture system 302 might output live action footage to a live action footage storage 520. A live action processing system 522 might process live action footage to generate data about that live action footage and store that data into a live action metadata storage 524. The live action processing system 522 might include computer processing capabilities, image processing capabilities, one or more processors, program code storage for storing program instructions executable by the one or more processors, as well as user input devices and user output devices, not all of which are shown. The live action processing system 522 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 514, as that might be useful in post-processing to match computer-generated lighting on objects that are computer-generated and overlaid on the live action footage. The live action processing system 522 might operate autonomously, perhaps based on predetermined program instructions, to generate and output the live action metadata upon receiving and inputting the live action footage. The live action footage can be camera-captured data as well as data from other sensors.

An animation creation system 530 is another part of the visual content generation system 500. The animation creation system 530 might include computer processing capabilities, image processing capabilities, one or more processors, program code storage for storing program instructions executable by the one or more processors, as well as user input devices and user output devices, not all of which are shown. The animation creation system 530 might be used by animation artists, managers, and others to specify details, perhaps programmatically and/or interactively, of imagery to be generated. From user input and data from a database or other data source, indicated as a data store 332, the animation creation system 330 might generate and output data representing objects (e.g., a horse, a human, a ball, a teapot, a cloud, a light source, a texture, etc.) to an object storage 534, generate and output data representing a scene into a scene description storage 536, and/or generate and output data representing animation sequences to an animation sequence storage 538.

Scene data might indicate locations of objects and other visual elements, values of their parameters, lighting, camera location, camera view plane, and other details that a rendering engine 550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 530 might be interactive, allowing a user to read in animation sequences, scene descriptions, object details, etc. and edit those, possibly returning them to storage (such as central storage unit 150) to update existing data. As an example, an operator might read in objects from object storage into a baking processor that would transform those objects into simpler forms and return those to the object storage 534 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 532 might be used to drive object presentation. For example, if an artist is creating an animation of a spaceship passing over the surface of the Earth, instead of manually drawing or specifying a coastline, the artist might specify that the animation creation system 330 is to read data from the data store 532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 544 might read in live action metadata, such as data representing movements and positions of body parts of a live actor during a live action scene, and generate corresponding animation parameters to be stored in the animation sequence storage 538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 522. The animation driver generator 544 might convert that movement data into specifications of how joints of an articulated CGI character are to move over time.

A rendering engine 550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 550 might include computer processing capabilities, image processing capabilities, one or more processors, program code storage for storing program instructions executable by the one or more processors, as well as user input devices and user output devices, not all of which are shown.

The visual content generation system 300 can also include a merging system 360 that merges live footage with animated content. The live footage might be obtained and input by reading from the live action footage storage 520 to obtain live action footage, by reading from the live action metadata storage 524 to obtain details such as presumed segmentation in captured images segmenting objects in a live action scene from their background (perhaps aided by the fact that the green screen 510 was part of the live action scene), and by obtaining CGI imagery from the rendering engine 550.

A merging system 560 might also read data from a rulesets for merging/combining storage 562. A very simple example of a rule in a ruleset might be "obtain a full image including a two-dimensional pixel array from live footage, obtain a full image including a two-dimensional pixel array from the rendering engine 550, and output an image where each pixel is a corresponding pixel from the rendering engine 550 when the corresponding pixel in the live footage is a specific color of green, otherwise output a pixel value from the corresponding pixel in the live footage."

The merging system 560 might include computer processing capabilities, image processing capabilities, one or more processors, program code storage for storing program instructions executable by the one or more processors, as well as user input devices and user output devices, not all of which are shown. The merging system 560 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 560, such as modifying boundaries of segmented objects, inserting blurs to smooth out imperfections, or adding other effects. Based on its inputs, the merging system 560 can output an image to be stored in a static image storage 570 and/or a sequence of images in the form of video to be stored in an animated/combined video storage 572.

Thus, as described, the visual content generation system 500 can be used to generate video that combines live action with computer-generated animation using various components and tools, some of which are described in more detail herein. While the visual content generation system 500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention, and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Although the description has been described with respect to particular embodiments thereof, these particular embodiments are merely illustrative, and not restrictive. For example, in some implementations, a plurality of image capture devices may be used to capture images from various angles of the same live action scene or to capture different portions of the live action scene and the images may be stitched together or particular images selected for the output image. In various implementations, additional equipment, techniques, and technologies may be employed to accommodate requirements of a particular visual production and live action scene, such as underwater scenes.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above. A computer readable medium can comprise any medium for carrying instructions for execution by a computer, and includes a tangible computer readable storage medium and a transmission medium, such as a signal transmitted over a network such as a computer network, an optical signal, an acoustic signal, or an electromagnetic signal.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method performed in real time for correlating data and images from a live action scene, under control of one or more computer systems configured with executable instructions, the method comprising:
    receiving auxiliary images with depth that include depth data of target objects in corresponding live action images of the live action scene;
    receiving marker data from marker images generated by a performance capture system;
    determining that marker data from at least one of the marker images correspond with at least one of the images with depth, wherein the marker data and the corresponding at least one auxiliary image with depth are received at different times associated with particular time blocks;
    providing the marker data and the corresponding at least one auxiliary image with depth to a computer graphic (CG) rendering system to generate a CG image having one or more CG elements, wherein the one or more CG elements are based, at least in part, on the depth data of the corresponding auxiliary image with depth; and
    compositing the CG elements with the corresponding at least one image having depth to generate at least one representative output image.

2. The computer-implemented method of claim 1, wherein determining the marker data and the corresponding at least one auxiliary image with depth, is based, at least in part, on an exposure time of a camera capturing the corresponding images of the live action scene and an exposure time of the performance capture system.

3. The computer-implemented method of claim 2, wherein determining the marker data and the corresponding at least one auxiliary image with depth is based, at least in part, on an exposure time of at least one depth camera capturing at least one depth image to provide the depth data.

4. The computer-implemented method of claim 1, wherein the live action images and the marker images include time stamps and wherein determining of the marker data and the corresponding at least one auxiliary image with depth is based on the time stamps.

5. The computer-implemented method of claim 1, further comprising generating a unique identifier for the marker data and the corresponding at least one auxiliary image with depth.

6. The computer-implemented method of claim 1, further comprising iteratively repeating to produce additional representative output images as additional live action images are captured of the live action scene.

7. The computer-implemented method of claim 1, wherein the method is performed during capturing of images of the live action scene.

8. A visual content composition system for correlating data and images from a live action scene in real time, the system comprising:
    one or more processors; and
    logic encoded in one or more tangible media for execution by the one or more processors and when executed is operable to perform operations comprising:
        receiving auxiliary images with depth that include depth data of target objects in corresponding live action images of the live action scene;
        receiving marker data from marker images generated from a performance capture system;
        determining that marker data from at least one of the marker images correspond with at least one of the images with depth, wherein the marker data and the corresponding at least one auxiliary image with depth are received at different times associated with particular time blocks;
        providing the marker data and the corresponding at least one auxiliary image with depth to a computer graphic (CG) rendering system to generate a CG image having one or more CG elements, wherein the one or more CG elements are based, at least in part, on the depth data of the corresponding auxiliary image with depth; and
        compositing the CG elements with the corresponding at least one auxiliary image with depth to generate at least one representative output image.

9. The visual content composition system of claim 8, wherein determining the marker data and the corresponding at least one auxiliary image with depth, is based, at least in part, on an exposure time of a camera capturing the corresponding images of the live action scene and an exposure time of the performance capture system.

10. The visual content composition system of claim 9, wherein determining the marker data and the corresponding at least one auxiliary image with depth is based, at least in part, on an exposure time of at least one depth camera capturing at least one depth image to provide the depth data.

11. The visual content composition system of claim 8, wherein the live action images and the marker images include time stamps and wherein determining of the marker data and the corresponding at least one auxiliary image with depth is based on the time stamps.

12. The visual content composition system of claim 8, wherein the operations further comprise generating a unique identifier for the marker data and the corresponding at least one auxiliary image with depth.

13. The visual content composition system of claim 8, wherein the operations further comprise iteratively repeating to produce additional representative output images as additional live action images are captured of the live action scene.

14. The visual content composition system of claim 8, wherein the operations are performed during a capturing of images of the live action scene.

15. A non-transitory computer-readable storage medium carrying program instructions thereon to correlate data and images from a live action scene in real time, the instructions when executed by one or more processors cause the one or more processors to perform operations comprising:
    receiving auxiliary images with depth that include depth data of target objects in corresponding live action images of the live action scene;

receiving marker data from marker images generated from a performance capture system;

determining that marker data from at least one of the marker images correspond with at least one of the images with depth, wherein the marker data and the corresponding at least one auxiliary image with depth are received at different times associated with particular time blocks;

providing the marker data and the corresponding at least one auxiliary image with depth to a computer graphic (CG) rendering system to generate a CG image having one or more CG elements, wherein the one or more CG elements are based, at least in part, on the depth data of the corresponding auxiliary image with depth; and compositing the CG elements with the corresponding at least one auxiliary image with depth to generate at least one representative output image.

16. The computer-readable storage medium of claim 15, wherein determining the marker data and the corresponding at least one auxiliary image with depth, is based, at least in part, on an exposure time of a camera capturing the corresponding images of the live action scene and an exposure time of the performance capture system.

17. The computer-readable storage medium of claim 16, wherein determining the marker data and the corresponding at least one auxiliary image with depth is based, at least in part, on an exposure time of at least one depth camera capturing at least one depth image to provide the depth data.

18. The computer-readable storage medium of claim 15, wherein the live action images and the marker images include time stamps and wherein the determining of the marker data and the corresponding at least one auxiliary image with depth is based on the time stamps.

19. The computer-readable storage medium of claim 15, wherein the operations further comprise generating a unique identifier for the marker data and the corresponding at least one auxiliary image with depth.

20. The computer-readable storage medium of claim 15, wherein the operations further comprise iteratively repeating to produce additional representative output images as additional live action images are captured of the live action scene.

* * * * *